(12) United States Patent
Kwok et al.

(10) Patent No.: US 7,968,158 B2
(45) Date of Patent: Jun. 28, 2011

(54) LIQUID CRYSTAL ALIGNMENT LAYER AND METHODS OF MAKING THEREOF

(75) Inventors: Hoi-Sing Kwok, Kowloon (CN); Fion Sze Yan Yeung, Wanchai (CN); Xie Fengchao, Kowloon (CN); Ophelia Kwan Chui Tsui, Kowloon (CN); Ping Sheng, Kowloon (CN)

(73) Assignee: The Hong Kong University of Science and Technology, Hong Kong (HK)

( * ) Notice: Subject to any disclaimer, the term of this patent is extended or adjusted under 35 U.S.C. 154(b) by 1196 days.

(21) Appl. No.: 10/958,634

(22) Filed: Oct. 5, 2004

(65) Prior Publication Data

US 2005/0260426 A1 Nov. 24, 2005

Related U.S. Application Data

(63) Continuation-in-part of application No. 10/853,348, filed on May 24, 2004, now abandoned.

(51) Int. Cl.
*C09K 19/56* (2006.01)
(52) U.S. Cl. .................. 428/1.2; 349/123; 349/129
(58) Field of Classification Search ............ 428/1.2–1.3; 349/123–136
See application file for complete search history.

(56) References Cited

U.S. PATENT DOCUMENTS

| | | | |
|---|---|---|---|
| 4,776,674 A * | 10/1988 | Filas et al. ............... | 349/136 |
| 5,119,221 A | 6/1992 | Nakajima et al. | |
| 5,280,375 A | 1/1994 | Tsuda et al. | |
| 5,473,455 A | 12/1995 | Koike et al. | |
| 5,907,380 A * | 5/1999 | Lien ............................ | 349/141 |
| 6,151,090 A | 11/2000 | Tanaka et al. | |
| 6,221,444 B1 * | 4/2001 | Okada et al. .................. | 428/1.25 |
| 6,235,867 B1 | 5/2001 | Eguchi et al. | |
| 6,316,574 B1 * | 11/2001 | Tanioka et al. ............... | 528/170 |
| 6,559,919 B1 * | 5/2003 | Tuffin .......................... | 349/172 |
| 6,731,362 B2 | 5/2004 | Park et al. | |
| 6,982,774 B1 * | 1/2006 | Nomura et al. ............... | 349/129 |
| 7,375,784 B2 * | 5/2008 | Smith et al. .................. | 349/129 |
| 2004/0041128 A1 * | 3/2004 | Carter et al. ................. | 252/500 |

FOREIGN PATENT DOCUMENTS

| | | | |
|---|---|---|---|
| CN | 1099148 A | | 2/1995 |
| CN | 1164666 A | | 11/1997 |
| EP | 0622657 A1 | | 11/1994 |
| JP | 02061614 A | * | 3/1990 |
| JP | 2000314890 A | | 11/2000 |
| WO | WO 01/29148 A1 | * | 4/2001 |

OTHER PUBLICATIONS

USPTO English Translation of JP 02061614, Kageyama et al., by FLS Inc., Jan. 2010.*
Armitage, David J., Appl. Phys. 51 (5), May 1980, American Institute of Physics, 2552-2555, "Alignment of liquid crystals on obliquely evaporated silicon oxide films".

(Continued)

*Primary Examiner* — Sophie Hon
(74) *Attorney, Agent, or Firm* — Ella Cheong Hong Kong; Margaret Burke; Sam Yip

(57) ABSTRACT

The present invention relates to a liquid crystal alignment layer used in a liquid crystal cell, which is capable of providing high pretilt angles.

31 Claims, 11 Drawing Sheets

OTHER PUBLICATIONS

Filas et al., Appl. Phys. Lett. 50 (20), May 18, 1987, American Institute of Physics, 1426-1428, "Chemically induced high-tilt surfaces for liquid crystals".

Mi et al., SID 99 Digest, 24-27, "5.1: Effects of Pretilt Angle on Electro-Optical Properties of Pi-Cell LCDs".

Xu et al., SID 98 Digest, 139-142, "11.4L: Late-News Paper: Very High Pretilt Alignment and Its Application in Pi-Cell LCDs".

Yang et al., Chem. Mater. 2002, 14, 369-374, "Nanoporous Ultralow Dielectric Constant Organosilicates Templated by Triblock Copolymers".

Written Opinion of the International Searching Authority dated Mar. 10, 2005 for International Application No. PCT/CN2004/001208, 3 pages.

\* cited by examiner

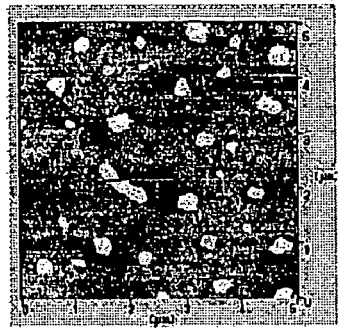
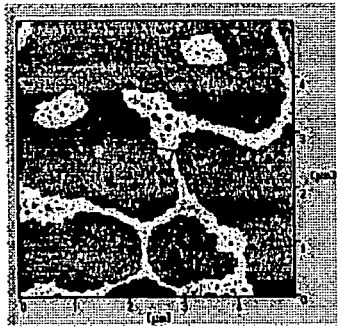
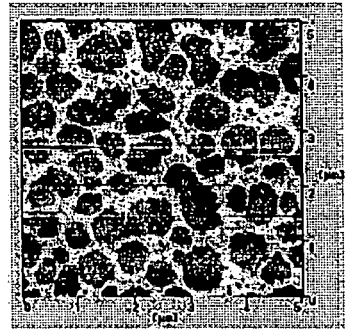
Fig. 5A     Fig. 5B     Fig. 5C
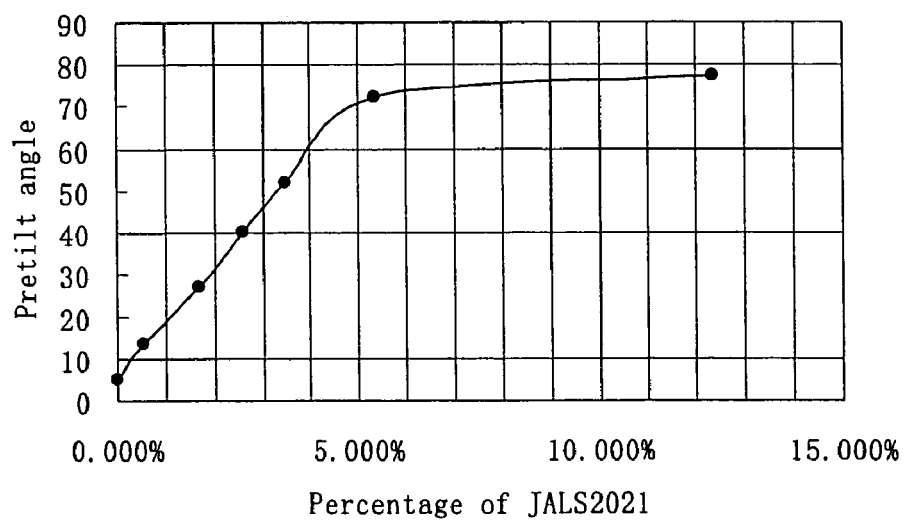
Fig. 6

LIQUID CRYSTAL ALIGNMENT LAYER AND METHODS OF MAKING THEREOF

FIELD OF INVENTION

The present invention is related to liquid crystal display (LCD) technologies, particularly related to an improved alignment layer capable of high pretilt angles and a method of producing the same. This application is a continuation-in-part of U.S. application Ser. No. 10/853,348, filed May 24, 2004, now abandoned.

BACKGROUND OF THE INVENTION

A liquid crystal display is consisted of, among many other things, a liquid crystal layer. The alignment behavior of this liquid crystal layer determines most of the optical properties of the liquid crystal display. This alignment is determined by the alignment layers in contact with the liquid crystal layer itself. The most common form of this alignment layer is a thin film of polyimide deposited on the substrate, which is usually glass. The preparation conditions of these top and bottom alignment layers provide an alignment direction as well as a pretilt angle for the liquid crystal molecules near the surface of the liquid crystal layer.

The pretilt angles achievable with common polyimides are predetermined and cannot be varied. In particular, it is very difficult to obtain large values of $\theta(0)$ from $10°-80°$. There are needs to make liquid crystal cells with large pretilt angles in the region near 40-60 degrees. Many new types of liquid crystal displays including bistable displays and fast response liquid crystal displays can be made only if high pretilt angles are available.

Traditionally, the best way to obtain high pretilt angles controllably is by oblique evaporation of $SiO_x$ in a vacuum. This is a well-known art and has been discussed in many open publications (see David Armitage, J Appl Phys, vol 51, p 2552, 1980). Another well-known art is the use of molecular Langmuir-Bloggett films. All of these methods are, however, impractical for mass production.

More recently, a new method of ion beam alignment has been disclosed by Chaudhari et al. in U.S. Pat. No. 6,195,146. Many different pretilt angles can be made similar to $SiO_x$ evaporation. Additionally, several inventions have been disclosed recently to address the same issue of large pretilt angles. Harada et al. in U.S. Pat. No. 5,744,203 disclose a new alignment material that can achieve high pretilt by simple rubbing. Brosig et al. in U.S. Pat. No. 5,172,255 teach a method of achieving high pretilt angle in a homogeneous polyimide by rubbing the same surface twice in opposite directions. It was said that by varying the rubbing strength of the second rub, various pretilt angles can be achieved. Resnikov et al. Kim et al. and Gibbons et al. in U.S. Pat. Nos. 6,633,355, 5,882,238 and 5,856,430 respectively disclose means of achieving high pretilt angle by the method of photo alignment. These methods are different in the particular material of the alignment layer used, and the difference in the light illumination geometry. It is claimed that the photon dosage will vary the pretilt angle achieved ultimately. The detailed physics of the photoalignment technique is still not clear.

Several inventions have been disclosed making use of co-polymers and polymer blends as alignment layers. Mizushima et al discloses a co-polymer in U.S. Pat. Nos. 5,612,450 and 5,756,649, wherein the pretilt angle can be changed by radiation. Nishikawa et al discloses a polymer blend wherein the residual voltage and image retention can be reduced in U.S. Pat. Nos. 5,698,135 and 5,969,055. Nakajima et al in U.S. Pat. No. 5,119,221 describes a co-polymer where different functional groups are contained within the polymer. The variation of the functional group ratio can provide varying pretilt angles. In U.S. Pat. No. 6,731,362, Park et al discloses a polymer blend of polyimide and poly-cinnamate wherein the pretilt angle can be controlled to within 5 degrees.

Accordingly, it is an object of the present invention to provide a novel alignment layer capable of achieving high pretilt angles in a liquid crystal cell. These novel alignment layers consist of nano-structures of at least two types of alignment materials at close proximity to each other. The nano-structure can take on many shapes and can be in the form of nano-domains or nano-networks. The pretilt angle can be controlled by changing the nano-structure of the alignment layer and the relative proportion of the different alignment materials. It is also an object of the present invention to provide a novel method of producing such an alignment layer for a liquid crystal layer in a liquid crystal cell.

SUMMARY OF INVENTION

In one aspect of the present invention, a liquid crystal alignment layer used in a liquid crystal cell to align liquid crystal molecules is provided. The alignment layer comprises nano-structures of:
  a) a horizontal alignment material capable of providing a first pretilt angle of the liquid crystal molecules in contact therewith;
  b) a vertical alignment material capable of providing a second pretilt angle of the liquid crystal molecules in contact therewith;
wherein the effective pretilt angle of the liquid crystal molecules in contact with and near the alignment layer can be controlled to have a value of between the first pretilt angle and the second pretilt angle. In a preferred embodiment, the first pretilt angle is between $1-10°$ and the second pretilt angle is between $80-90°$. In a more preferred embodiment, the first pretilt angle is between $1-8°$, and the second pretilt angle is between $85-90°$. In another preferred embodiment, said alignment layer comprises nano-structures of either the vertical alignment material or the horizontal alignment material. In another preferred embodiment, the nano-structures comprise both the horizontal and vertical alignment materials. In yet another embodiment, the nano-structures are horizontal alignment material. In still another embodiment, the nano-structures are vertical alignment materials. In still another preferred embodiment, the nanostructures are of sizes of 0-1 microns.

In a preferred embodiment, at least one of said alignment materials is a polymer. In a more preferred embodiment, at least one of said alignment materials is selected from a group consisting of polyimide, polystyrene, poly-methyl methacrylate, polycarbonates, polyamic acid, and polyvinyl alcohol. In a better preferred embodiment, at least one of said alignment materials are polyimides. In a still more preferred embodiment, the horizontal alignment material is selected from a group consisting of JALS9203, AL1454, AL5056, AL3046, JALS-1216, JALS-1217, SE-7992, SE-7492 and SE-5291 and the vertical alignment material is selected from a group consisting of JALS-2021, JALS-2066, SE-7511L and SE-1211. In a most preferred embodiment, the horizontal alignment material is JALS9203 and the vertical alignment material is JALS2021.

In another preferred embodiment, the weight: weight ratio of the horizontal alignment material to the vertical alignment material is 1:99 to 99:1. In a more preferred embodiment, the weight: weight ratio of the horizontal alignment material to the vertical alignment material is 1:4 to 4:1.

In yet another preferred embodiment, the polar anchoring energy on the alignment layers ranges between $5 \times 10^{-4}$ J/cm$^2$ to $2.5 \times 10^{-3}$ J/cm$^2$.

In another aspect of the present invention, a process of making an alignment layer in a liquid crystal cell is provided, which comprises:
- a) dissolving a horizontal alignment material and a vertical alignment material in a solvent to form a homogeneous solution;
- b) forming a liquid film on a substrate from such a solution;
- c) curing the film to form a hardened solid film; and
- d) treating the hardened solid film to obtain a uniform alignment direction.

In a preferred embodiment, the horizontal alignment material is capable of providing a first pretilt angle in the alignment layer, and the vertical alignment material is capable of providing a second pretilt angle in the alignment layer. Use of the expression horizontal alignment material throughout the specification refers to horizontal alignment materials that induce liquid crystal molecules in contact therewith to be aligned 0 degrees to the surface thereof as well as horizontal alignment materials that induce liquid crystal molecules in contact with the surface thereof to be aligned at greater than 0 degrees to the surface thereof, for example, horizontal alignment materials that induce liquid crystal molecules in contact with the surface thereof to be aligned at an angle greater than 0 degrees up to about 12, 11, 10, 9, 8, 7, 6, 5, 4, 3, 2, 1, 0.5 or 0.1 degrees. Use of the expression vertical alignment material throughout the specification refers to vertical alignment materials that induce liquid crystal molecules in contact therewith to be aligned 90 degrees to the surface thereof as well as vertical alignment materials that induce liquid crystal molecules in contact with the surface thereof to be aligned at less than 90 degrees to the surface thereof, for example, vertical alignment materials that induce liquid crystal molecules in contact with the surface thereof to be aligned at an angle less than 90 degrees to about 78, 79, 80, 81, 82, 83, 84, 85, 86, 87, 88, 89, 89.5, or 89.9 degrees. In a more preferred embodiment, the first pretilt angle is 1-10° and the second pretilt angle is 80-90°. In a further preferred embodiment, the first pretilt angle is 1-8° and the second pretilt angle is 85-90°.

The horizontal alignment material may be wholly or at least partly miscible with the vertical alignment material.

In another preferred embodiment, the horizontal alignment material is dissolved in a first solvent before mixing. In still another preferred embodiment, the vertical alignment material is dissolved in a second solvent before mixing.

In still another preferred embodiment, the film formed in step b) contains nanostructures of either the vertical alignment material or the horizontal alignment material. In another embodiment, the nanostructures consist both the horizontal and vertical alignment materials. The sizes of the nanostructures are 0-1 micron.

In yet another preferred embodiment, at least one of said alignment materials is polymer. In a more preferred embodiment, at least one of said alignment materials is selected from a group consisting of polyimide, polystyrene, poly-methyl methacrylate, polycarbonates, polyamic acid, and polyvinyl alcohol. In a better preferred embodiment, at least one of said alignment materials are polyimides. In another embodiment both the horizontal and vertical alignment materials are polyimides. In a most preferred embodiment, the horizontal alignment material is JALS2021 and the vertical alignment material is JALS9203.

In still another preferred embodiment, the first and second solvents are selected from a group consisting of methyl-2-pyrrolidone (NMP), dimethyl formamide (DMF), γ-butyrolactone (γBL), Butyl cellosolve (BC) and THF (tetrahydrofuran). In a more preferred embodiment, the first solvent comprises γBL, NMP, and BC and the second solvent comprises NMP and BC. In a most preferred embodiment, the first and second solvents are solvents that are contained in the JALS 9203 and JALS2021.

In yet another preferred embodiment, the weight: weight ratio of the horizontal alignment material to the vertical alignment material is 1:99 to 99:1. In a more preferred embodiment, the weight: weight ratio of the horizontal alignment material to the vertical alignment material is 1:4 to 4:1.

In another preferred embodiment, the curing comprises a first baking at 80-120° and a second baking at about 200-250°. In yet another embodiment, the curing is photo curing.

In still another embodiment, the film is formed by spin coating, screen printing, spraying, or inkjet printing.

In yet another embodiment, the rubbing is mechanical rubbing done with a piece of fabric in a fixed direction or by irradiating the surface with an ion beam in vacuum in a fixed direction at a fixed incident angle.

In a further embodiment, the substrate is indium tin oxide coated glass. In a preferred embodiment, the indium tin oxide is patterned into rows and columns in a passive matrix display. In a more preferred embodiment, the substrate consists of an array of thin film transistors in active matrix driving.

In a further aspect of the invention, a process of forming a solution for preparing an alignment layer capable of providing a first pretilt angle between 8° and 85° is provided. The process comprises mixing a horizontal alignment material and a vertical alignment material in a solvent, wherein said horizontal alignment material capable of providing a first pretilt angle in said alignment layer, and said vertical alignment material capable of providing a second pretilt angle in said alignment layer. In a preferred embodiment, the first pretilt angle is 0-10° and the second pretilt angle is 80-90°. In a more preferred embodiment, the first pretilt angle is 0-8° and the second pretilt angle is 85-90°.

In a preferred embodiment, the process comprises mixing commercially available horizontal and vertical alignment materials. In a more preferred embodiment, the horizontal alignment materials are selected from JALS9203, AL1454, AL5056, AL3046, JALS-1216, JALS-1217, SE-7992, SE-7492 and SE-5291; the vertical alignment materials are selected from JALS-2021, JALS-2066, SE-7511L and SE-1211.

In another embodiment, said solvent is capable of forming a solution comprising nano-sized droplets. In a preferred embodiment, the droplets are either the horizontal or the vertical alignment materials. In another preferred embodiments, the droplets are both the vertical and the horizontal alignment materials.

BRIEF DESCRIPTION OF THE DRAWINGS

FIGS. 5A, 5B, and 5C are a set of photographs showing examples of some nano- and micro-domains of a solid film formed by liquid crystal alignment agent according to still another aspect of the present invention. Here the films are prepared by spin coating.

FIG. 6 is a chart showing the relationship between the pretilt angles and the concentration of vertical alignment material (JALS 2021) in accordance with the still another aspect of the present invention.

DETAILED DESCRIPTION

Substrate used herein refers to the two support structures used in a LCD cell to sandwich a layer of liquid crystal, wherein an alignment layer lies in between the liquid crystal layer and each piece of the substrate. In one embodiment, the substrate is a glass substrate coated or patterned with electrodes on the surface thereof, which control the LCD display. In another embodiment of the present invention, the electrodes are embodied in a film of Indium Tin Oxide (ITO). In a more preferred embodiment of the present invention, the ITO film is patterned into rows and columns in a passive matrix display. In another embodiment of the present invention, one of the substrates has an array of thin film transistors for active matrix driving of the display. In still another preferred embodiment, the substrate can be a single crystalline silicon wafer with active matrix transistors fabricated on it. In all embodiments, an array of color filters can be deposited onto the substrate for a color display.

Liquid crystal cell used herein refers to a component in a LCD device, comprising at least of two substrates, two liquid crystal alignment layers, and one liquid crystal layer. The liquid crystal cell is operable in an LCD device when coupled with other components necessary in an LCD display such as polarizers and thin film retarders.

Figure 1:
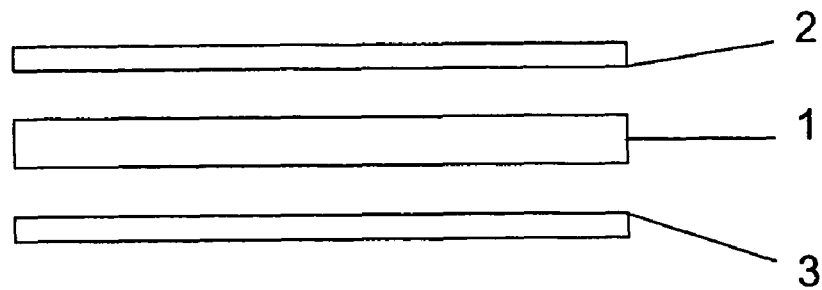
FIG. 1 is a diagram showing the sectional view of a portion of a LCD device according to one aspect of the present invention.
Figure 2:
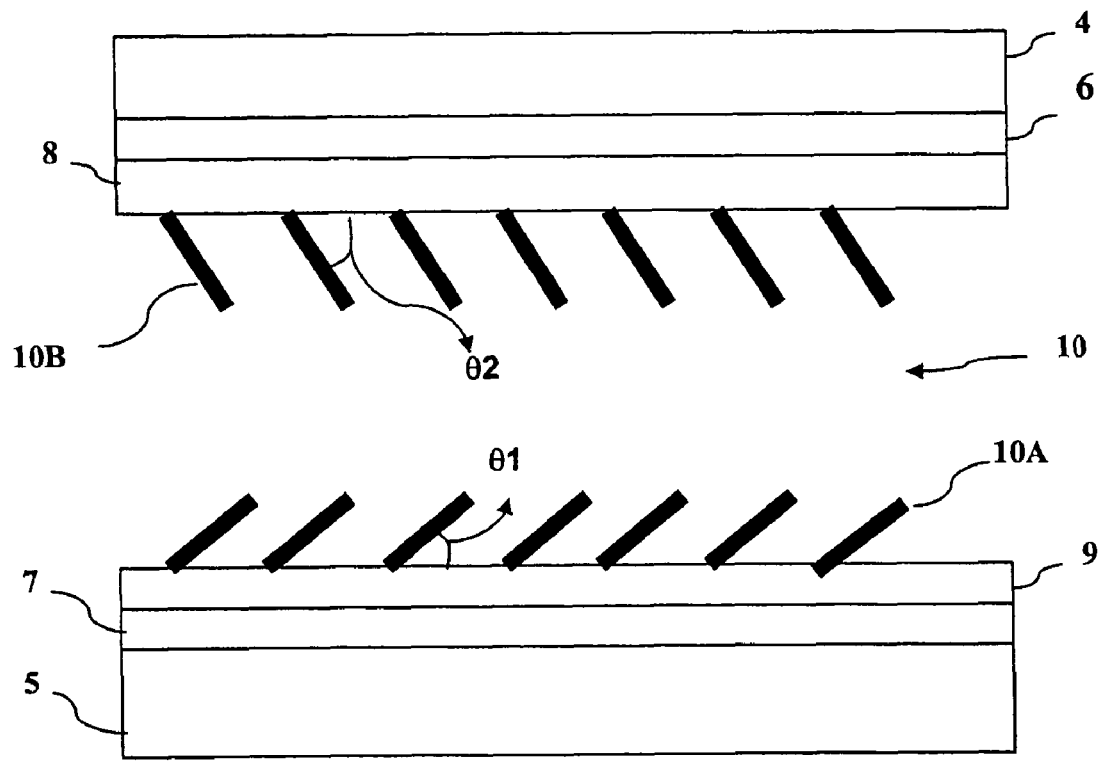
FIG. 2 is a diagram showing the sectional view of a portion of a liquid crystal cell according to another aspect of the present invention.

Referring to FIG. 1, a liquid crystal display is usually made of a liquid crystal cell 1 and two polarizers 2 and 3. One embodiment of a liquid crystal cell when no voltage is applied is shown in FIG. 2, which is composed of a top substrate 4 and a bottom substrate 5; two transparent conductive electrodes 6 and 7, two alignment layers 8 (top alignment layer) and 9 (bottom alignment layer) and the liquid crystal layer 10. Angle $\theta_1$ formed between the first layer of liquid crystal molecules 10A and the surfaces of the bottom alignment layer 9 is called the pretilt angle. Angle $\theta_2$ formed between the first layer of liquid crystal molecules 10B and the surface of the top alignment layer 8 is another pretilt angle. $\theta_2$ and $\theta_1$ may be the same or different from each other. In this liquid crystal display, the substrates 4 and 5 can be made of glass. One of the glass substrates such as 5 can be an active matrix backplane with a thin film transistor array. Alternatively, one of the substrates such as 4 can be made of glass while the other substrate 5 can be an opaque material such as silicon. If both substrates are made of glass, then the liquid crystal display can be operated in the transmittive or transflective mode. If one of the substrate is opaque, then the liquid crystal display can only operate in the reflective mode. Such opaque substrate can arise, for example, in a silicon based microdisplay with active matrix transistors fabricated onto the silicon wafer.

One of the other essential elements of the first preferred embodiment is the liquid crystal layer 10 which is sandwiched between the said substrates. The thickness of the liquid crystal layer is fixed by having spacers (not shown in the figure) inside the liquid crystal cell. The most important parameter for the liquid crystal layer is the pretilt angle at the boundary with the alignment layer. These pretilt angles $\theta_1$, and $\theta_2$ determine the $\theta(z)$ and $\phi(z)$ (see FIG. 3) of the liquid crystal layer 10 when no voltage is applied.

Figure 3:
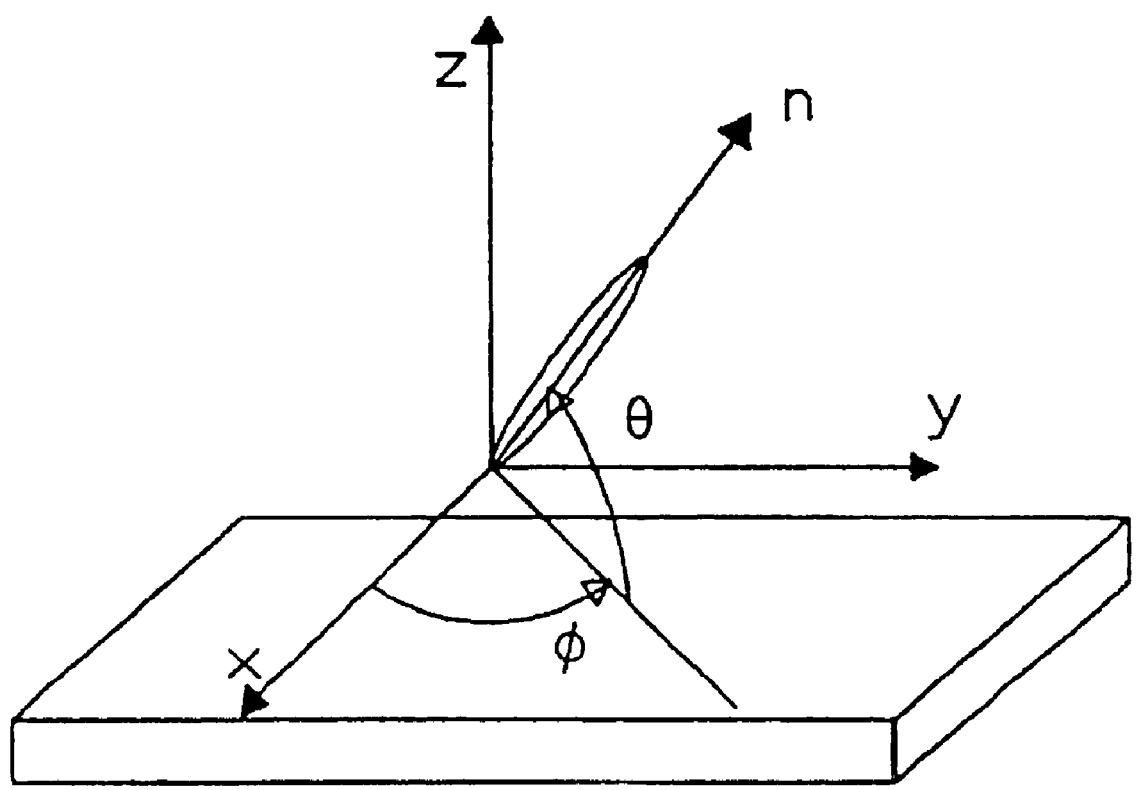
FIG. 3 illustrates a liquid crystal director in Cartesian coordinates.

This liquid crystal layer is characterized by a liquid crystal director with orientations $\theta$ and $\phi$, which are the azimuthal and polar angles respectively as shown in FIG. 3. The alignment of the director, i.e. the values of $\theta(z)$ and $\phi(z)$ determines the optical properties of the liquid crystal cell. It determines basically the transmittance or reflectance of the liquid crystal cell. As shown in FIG. 3, the director of liquid crystal molecule n is determined by a pretilt angle (tilt angle) $\theta$ which corresponds to a polar angle of the director n and a pretilt angle direction (twist angle) $\phi$ which corresponds its azimuthal angle. The Cartesian coordinate of the director n of liquid crystal molecule is defined:

$$n = (\cos\theta \cos\phi, \cos\theta \sin\phi, \sin\theta).$$

The director n of liquid crystal is determined by controlling the pretilt angle $\theta$ and the pretilt angle direction $\phi$ by carrying out alignment process on the substrate.

Figure 3A:
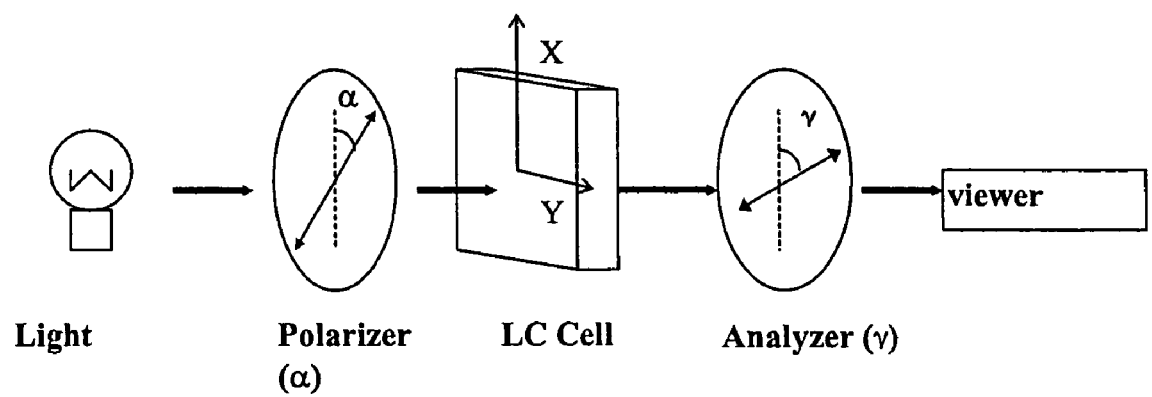
FIG. 3A illustrates the position of a polarizer, analyzer, light, and viewer relative to the liquid crystal cell according to yet another aspect of the present invention.

The transmission or reflectance of light by the liquid crystal cell is determined by the angle of the polarizer $\alpha$ and the angle of the analyzer $\gamma$ as shown in FIG. 3A, and the alignment condition of the liquid crystal layer 10. The electrodes 6, 7 and the alignment layers 8, 9 are used to control the alignment conditions of the liquid crystal layer 10. The electrodes provide the voltage to control the values of $\theta(z)$ and $\phi(z)$. The alignment layers and their treatment determine the values of $\theta(0)$ and $\phi(0)$. The values of $\theta(0)$ and $\phi(0)$, together with the elastic Eulers equation, determine the solution of $\theta(z)$ and $\phi(z)$. The physics of the alignment of the liquid crystal layer is well-known in the art and is well covered in the literature, such as given in the monograph "Electrooptic Effects in Liquid Crystal Materials" written by Blinov and Chigrinov, published by Springer in 1994. $\theta(0)$ and $\phi(0)$ are known as the easy axes for liquid crystal alignment. Since there are two surfaces to the liquid crystal layer, both θ(0), φ(0) and θ(d), φ(d) are needed to completely determine θ(z) and φ(z). Here d stands for the other surface at z=d. The invention disclosed here can be applied to control either θ(0), φ(0) or θ(d), φ(d) or to both sets of values. For the purpose of discussion, we shall only refer to the z=0 surface in the rest of this disclosure.

Essentially, in the continuum theory, the director orientation θ(z) and φ(z) is determined by minimization of the elastic energy, known as the Frank-Oseen elastic energy given by:

$$F = \frac{1}{2}K_{11}(\nabla \cdot n)^2 + \frac{1}{2}K_{22}(n \cdot \nabla \times n - q_o)^2 + \frac{1}{2}K_{33}|n \times \nabla \times n|^2$$

where $K_{ii}$ are the elastic constants and $q_o$ is the intrinsic twist of the liquid crystal layer. The minimization leads to the Euler-Lagrange equations subjected to the various boundary conditions θ(0), φ(0) and θ(d), φ(d).

It should be noted that the actual alignment directions of the liquid crystal on the surfaces is also dependent on the anchoring energies of the alignment surfaces. The anchoring energy is a measure of how strong the anchoring condition is. If the anchoring energy is large, then it is difficult to deviate from this condition and the alignment angles are given by the easy axes directions. For weak anchoring, the actual angles of the liquid crystals on the surface may deviate from θ(0) and φ(0). Again, well-known formulas are available to calculate the alignment of the liquid crystal molecules for all values of z given the anchoring energies.

The values of θ(0) and φ(0) or the alignment of the liquid crystal molecules right near the alignment layer are important in designing the electro optical properties of the liquid crystal cell and is the subject of the present invention. The alignment of the liquid crystal molecules can be achieved by many means and is a well studied problem in liquid crystal physics and engineering. The predetermined alignment conditions are usually achieved, for example, by rubbing the alignment layers 8, 9.

While the rubbing direction determines φ(0), the value of the pretilt angle θ(0) is determined mostly by the material of the alignment layers 8, 9. There are homogeneous alignment materials such as polyimides that can provide pretilt angles of 1°-8° for manufacturing twisted nematic (TN) and supertwisted nematic (STN) liquid crystal displays. This kind of material is also called horizontal alignment material. There are also materials that can provide homeotropic alignment with pretilt angles of 85°-90° for manufacturing vertically aligned nematic (VAN) liquid crystal displays. This kind of material is also called vertical alignment material. These homogeneous and homeotropic materials are available commercially. Many inventions have been disclosed on different types of chemicals that can provide horizontal or vertical alignments. But it is noted that these alignment layers can only provide either horizontal or vertical alignments. It is impossible to obtain alignment polar angles that are in between. In particular, no known polyimide alignment materials are known that can give a pretilt angle of near 45°. These polyimide alignment materials have served the liquid crystal display industry well. Large quantities are used for making practical LCD.

Alignment layers are used routinely to obtain alignment of liquid crystal layers to make liquid crystal displays. There are many alignment materials reported in the literature for this purpose. These materials are mostly polymers that are stable against heat and light. Examples are polyimide (PI), polyvinyl alcohol (PVA), polyester and polyamic acid (PA). These materials are commonly spin coated or screen printed on the substrate 4 and 5. Prebaking and final baking steps are needed to harden and cure the polymeric materials. Some of these polymeric alignment agents can provide a homogeneous alignment condition with a pretilt angle of a few degrees. Some special alignment agents can provide a homeotropic or vertical alignment for the liquid crystals with a pretilt angle of near 90 degrees. Both types of polymers can be coated and cured on the substrates for making alignment layers on the substrates 4 and 5, and are well-known in the art.

While in most LCD, the alignment layers are homogeneous. Rubbing or other treatments produces a uniform pretilt angle in a preferred direction. This invention, however, deals with alignment layers that are inhomogeneous. The alignment layer consists of nano-structures in the form of either nano-domains or nano-networks of at least two different types of alignment materials.

Tsui et al described a technique of writing domains that give horizontal alignment of the liquid crystal in orthogonal directions. Suppose the liquid crystal cell is described by x-y-z coordinates with the z-direction pointing from one substrate to another, and the x-y plane is the plane of the liquid crystal layer, as shown in FIG. 3. Tsui et al used atomic force microscope to make some domains to have x-direction alignment and some domains to have y-direction alignment, they demonstrated that at some distance away from the alignment layer surface, the liquid crystal molecules will be aligned at 45° to the x-axis with a certain pretilt angle.

The alignment of the liquid crystal molecules in the case of an inhomogeneous alignment layer is similar to the case of a homogeneous layer. Inside the bulk and near the surface of the alignment layer, the liquid crystal molecules will always align themselves so as to minimize the elastic energy of the entire system. As mentioned above, the elastic energy is described by the Frank-Oseen elastic energy F. As is obvious, if the alignment of the liquid crystal near the domain surfaces obeys exactly the alignment force given by the alignment domains, then there will be discontinuity if the director along the surface of the alignment layer. This leads to large elastic deformation energy. The liquid crystal system will have to relax to a more uniform director distribution with more common directions in order to minimize F. In our invention, we make use of this elastic energy minimization to produce variable pretilt angles in alignment layers with nano-structures consisting of at least two types of alignment materials. Such nano-structures are produced by mixing alignment materials in the solution form and forming a solid film from such solutions.

There are also inventions disclosing the use of mixture of alignment materials and mixtures of alignment and non-alignment materials to achieve high pretilt angles. However, all the alignment layers previously disclosed are homogeneous and uniform as either co-polymers or polymer blends. In this invention, we disclose an alignment layer with a nano-structure consisting of two different alignment materials, as well as methods for producing them. Such alignment layers can achieve high pretilt angles of values between 10-80 degrees.

Figure 4:
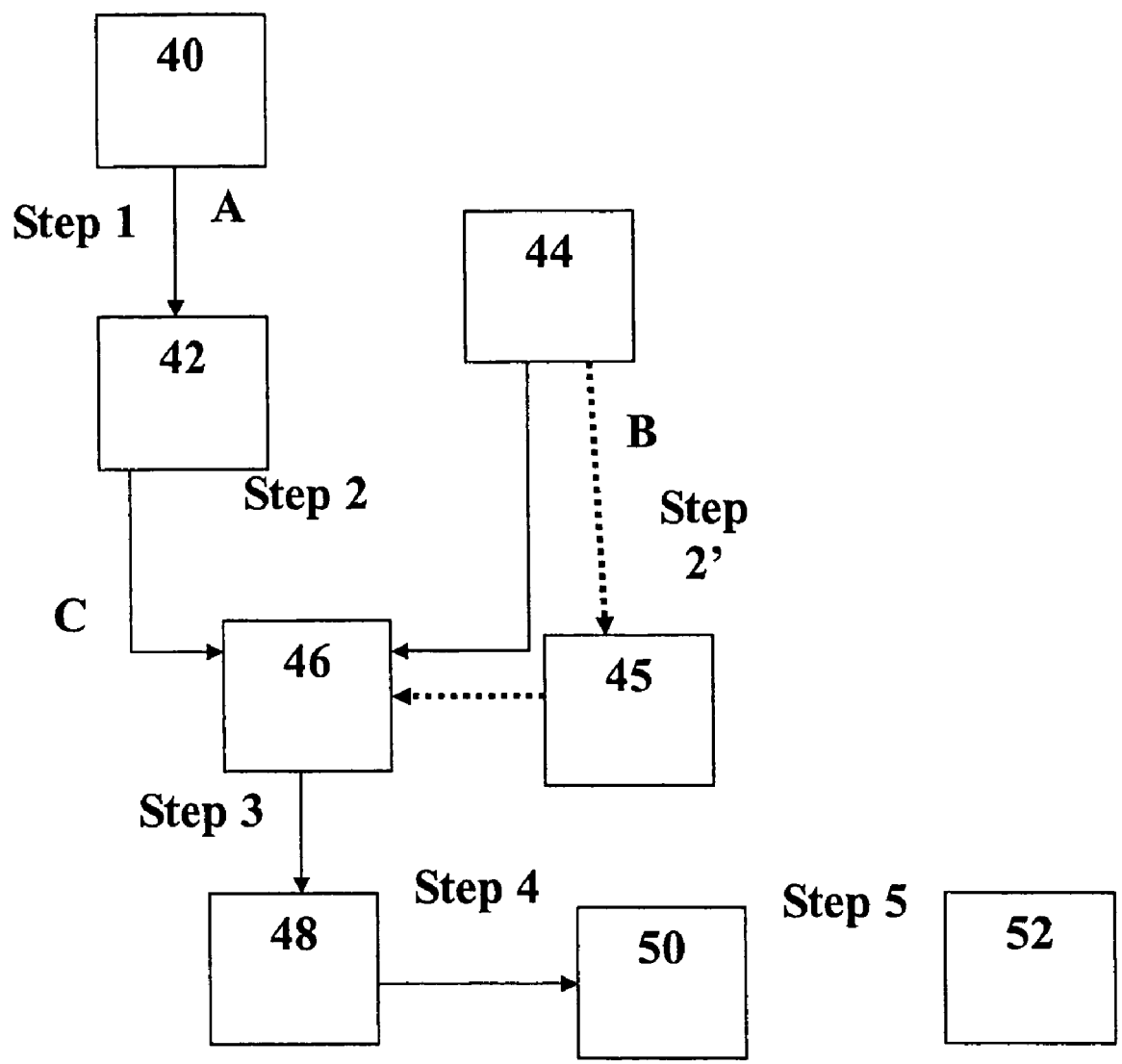
FIG. 4 is a flow chart showing a process of making a liquid crystal alignment layer according to yet another aspect of the present invention.

FIG. 4 shows an embodiment of the process of making the liquid crystal alignment layer according to one aspect of the present invention. In step 1, a vertical alignment material 40 is diluted with a solvent A that is fully miscible with the vertical alignment material 40, forming a VM solution 42. In step 2, the VM solution 42 and a horizontal alignment material 44 are both dissolved in a solvent C, forming a final mixture 46. In an alternative step 2', the horizontal alignment material 44 is first dissolved in a solvent B, forming a HM solution 45 before mixing with the VM solution 42 in solvent C. In step 3, the mixed solution 46 is applied to a substrate to form a solid film 48. The solid film 48 is then treated by thermal curing, which comprises a pre-baking and a final baking process in step 4 to form a hardened solid film 50. The hardened solid film has a thickness between 10 nm-300 nm. The hardened solid film 50 is then rubbed in step 5 to produce the desired liquid crystal alignment layer 52. The rubbing can be achieved by mechanical rubbing, which comprises applying a piece of fabric in a fixed direction.

The about-mentioned processes are only embodiments of the present invention. Many variations are available and known to those skilled in the art as alternative ways to implement the present invention. For example, the step of forming a solid film from the solution mixture 46 is very important. Different procedures can lead to different micro- or nano-structures in the solid film. As well, the curing process in step 4 can also be done by photo-curing. The rubbing in step 5 can also be done by irradiating the surface of the alignment layer with an ion beam in vacuum in a fixed direction at a fixed incident angle.

Figure 4A:
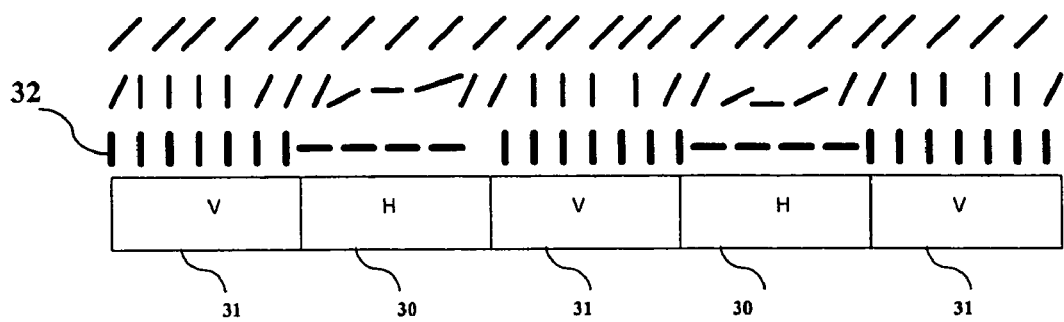
FIG. 4A is a diagram illustrating the orientations of liquid crystal molecules near the alignment layer consisting of horizontal (H) and vertical (V) domains.

The alignment of the liquid crystal molecules near the new alignment layers disclosed here is based on elastic energy minimization and the nano-structure of the alignment layers. Essentially, if there are nano-structures of at least two different kinds of alignment materials, the liquid crystal molecules will try to accommodate the alignment forces due to these nano-structures, which may be quite different. For example, one of embodiments of the present invention consists of two different materials, one can impart a vertical (V) alignment to the liquid crystal molecules and the other material can impart a horizontal (H) alignment to the liquid crystal molecules. The situation is schematically shown in FIG. 4A. 30 and 31 are domain structures of the vertical (V) and horizontal (H) alignment materials, respectively. 32 represent the liquid crystal molecules in contact with the alignment layer.

The liquid crystal molecules right next to the alignment layer will be either horizontally or vertically aligned. But away from the immediate surface, the liquid crystal molecules will tend towards a uniform alignment with a uniform pretilt angle that will minimize the total elastic deformation energy. Usually this constant pretilt angle is achieved at a short distance of a fraction of the domain size from the alignment surface. Since the transition from a conformational alignment to this uniform alignment occurs in a short distance for the case of nano-structures, and the cell gap is usually much larger, this uniform pretilt angle can be regarded as the pretilt angle given by the alignment layer, for the purpose of calculation the change in the director orientation inside the liquid crystal cell.

According to the teaching of the present invention, if the domain size is not that much smaller than the cell gap, the situation becomes more complicated and one cannot describe the alignment layer as having a uniform pretilt angle. So the use of the term pretilt angle in this invention is a generalized one. It is the same as the pretilt angle for the case of a uniform alignment layer without nano-structures (domains) if the cell gap is much larger than the domain size. The domain size or the nano-structure feature size in the present invention should be smaller than 1 micron.

Figure 4B:
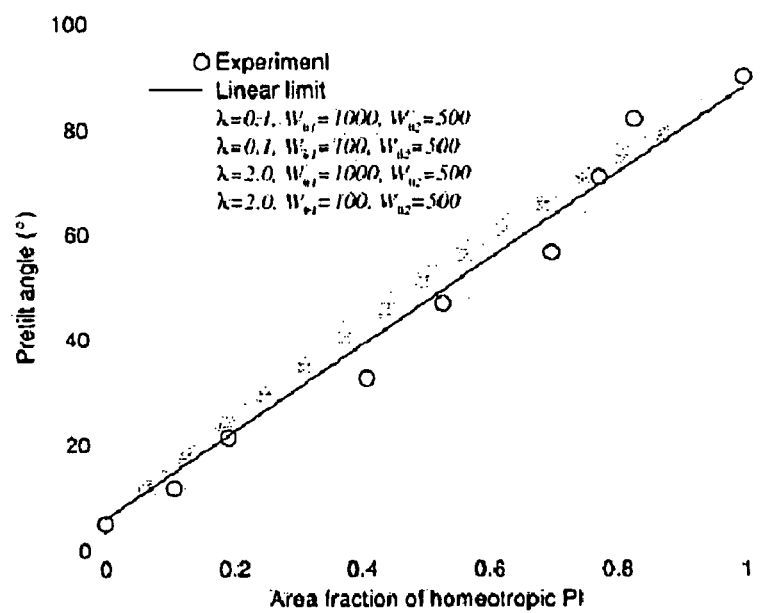
FIG. 4B is a chart illustrating the results of calculation of uniform pretilt angle as a function of area fraction of H and V domains.

According to the teaching of the present invention, the nano-structure or nano-domain is randomly distributed. The nano-structure or domains can also be regular if the preparation of the alignment layer is carried out through special methods such as nano-lithography. Theoretical simulation of the pretilt angle can be carried out quite readily by solving the Euler-Lagrange equations with the variable boundary conditions. FIG. 4B shows the results of such a calculation showing the pretilt angle obtained as a function of the area fraction of the V alignment material for various domain sizes.

From the teachings of the present invention, we know that this final pretilt angle is determined by (1) the area ratio of the horizontal (H) and vertical (V) domains, (2) the relative anchoring energy of the H and V materials. Physically, if the area ratio of V increases, the pretilt angle should increase as well. This positive correlation is shown in FIG. 4B. The exact dependence can be calculation by exact theoretical simulation. But the exact dependence is not crucial in this invention disclosure. Here, it suffices to say that there is a definite correlation between the domain size distribution and the final pretilt angle obtained.

It has been discovered by the present invention that changing the area fraction of the H and V domains, one can achieve various pretilt angles near the alignment layer surface. It is the purpose of this invention disclosure to teach how the domains can be fabricated in a reproducible manner.

General speaking, the processes of forming of an alignment layer are as follows:

Taking alignment agent H which is dissolved in solvent A where A can be a mixture of different solvents.

Taking alignment agent V which is dissolved in solvent B where B can be a mixture of different solvents, whereas solvent A and solvent B may have some component solvents that are the same.

Making a liquid film using this mixture on a substrate.

Driving out the solvent from the liquid film to make a soft solid film.

Baking the film further to form a hard alignment layer.

The mixture of H and V in a solvent is applied to the substrate first to form a liquid film. The liquid film is then turned into a solid film. The manner in which the liquid film is solidified is crucial to this invention and in determining the properties of the alignment layer. In most cases, the solubility of H and V are different in the solvent. As the solvent dries, the concentration of H and V increase and eventually precipitate. The material with a lower solubility will precipitate first. The domains formed will depend strongly on the solidification rate and the adhesion properties of the material onto the ITO glass. If the solubility of H and V are different and/or the adhesion properties are different, then there will be domains formed. That is the solid film will consist of domains of H and V materials.

There are several possibilities of forming domain structures when the solid film is formed. In one example, the H alignment material is more adhesive to the glass substrate, and is also present in larger quantity. The domain structure will schematically look like FIGS. 4C and 4D.

Figure 4C:
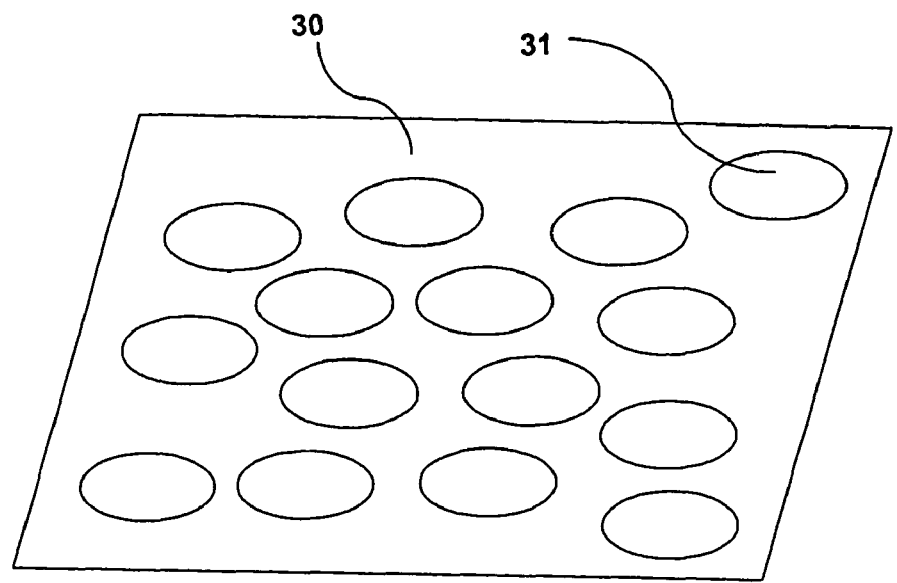
FIG. 4C is a diagram illustrating one example of domain structure.
Figure 4D:
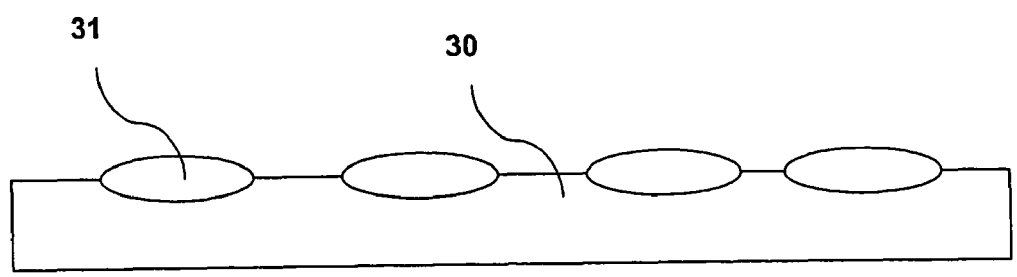
FIG. 4D is a diagram illustrating another example of H and V domain structure viewed from the side.

If there is big disparity in the precipitation rate and adhesion properties between H and V, it is expected that the domains will not be uniform across the entire thickness of the solid film that is, discontiguous domains of H and V are formed as seen in FIG. 4D. A structure like FIG. 4D may be possible. In this case, the volume ratio of H and V is different from the surface area ratio of H and V.

On the other hand, if the precipitation rates are similar and/or the solvent is driven out rapidly (rapid solidification), the domains will be small. The influence of different adhesion will be small and the domains should have a random horizontal and vertical structure, as shown schematically in FIG. 8. In this case, the volume ratio of H and V will be similar to the surface area ratio of H and V.

Figure 4E:
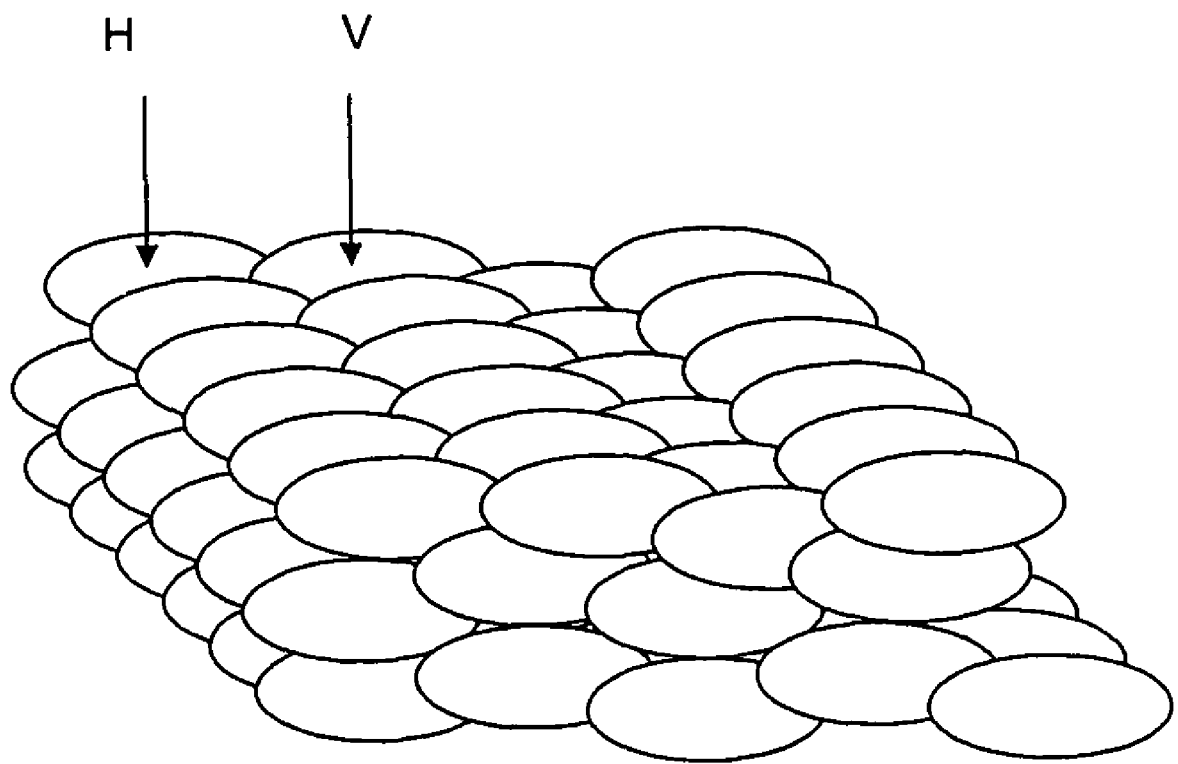
FIG. 4E is a diagram illustrating yet another example of domain structure in a 3D view.

FIG. 4D could be representative of spin coated films where the solvent is driven out of the liquid film more slowly (example 1), while FIG. 4E may be representative of the situation of printed liquid films where the solvent is driven off rapidly using a hot plate (Example 2). These are examples of possible domain structures, but clearly there are other possibilities based on the teachings provided herein.

Example 1

Example 1 shows the procedures adopted to prepare an alignment layer capable of providing a pretilt angle of 44 degree.

Materials:

The horizontal alignment material: purchased from Japan Synthetic Rubber Company (model number: JALS9203), which was in a solution form. (JSR Corporation, 5-6-10 Tsukiji Chuo-ku, Tokyo, 104-8410, Japan.) The solvent in JALS9203 comprises γ-butyrolactone (γBL), methyl-2-pyrrolidone (NMP), and Butyl cellosolve (BC).

The vertical alignment material: purchased from Japan Synthetic Rubber Company (model number: JALS2021), which was in a solution form. The solvent in JALS2021 comprises methyl-2-pyrrolidone (NMP) and Butyl cellosolve (BC).

Substrate: an ITO glass coated with electrodes, purchased from Nanbo Company, Shenzhen, China.

Procedures:

0.95 g of horizontal alignment material solution and 0.05 g of the vertical alignment material solution were mixed together and stirred thoroughly. The mixture was applied to the substrate to obtain a soft solid film using spin coating. The spin coating was first operated at 800 rmp for 10 sec and then at 3500 rmp for 100 sec. A soft film consisting of the horizontal and vertical alignment materials was formed with remnant solvents.

In order to drive out all the remnant solvents and to cure the polymers, the coated glass was placed in an oven. It was first baked at 100° C. for 10 min (soft bake) and then baked at 230° C. for 90 min (hard bake). A hard film, i.e., the alignment layer, was formed.

The surface of the alignment layer was subjected to rubbing treatment using a nylon cloth in such a way that the layer was rubbed in one direction one time.

Result:

The pretilt angle of the alignment layer produced accordingly to Example 1 was 44 degree.

Example 2

Example 2 shows the procedures adopted to prepare an alignment layer capable of providing a pretilt angle of 53 degree.

Materials:

The horizontal alignment material: purchased from Japan Synthetic Rubber Company (model number: JALS9203), which was in a solution form.

The vertical alignment material: purchased from Japan Synthetic Rubber Company (model number: JALS2021), which was in a solution form.

Substrate: an ITO glass coated with electrodes, purchased from Nanbo Company, Shenzhen, China;

Procedures:

0.5 g of the solution of horizontal alignment material and 0.5 g of the solution of the vertical alignment material were mixed together and stirred thoroughly. The mixture was applied to the substrate to obtain a soft solid film using print coating as follows:

A stainless steel rod of 2 cm diameter and 5 inches long was placed on the substrate. A few drops of the mixture were placed underneath the rod until it spreaded out along the contact line between the rod and the surface of the substrate. The rod was then rolled or slided along the substrate surface to form a liquid film.

The coated substrate was then placed on a hot plate at 100° C. for 10 min to drive out all the solvents. It was then put in an oven for hard baking at 230° C. for 90 min. A hard film consisting of vertical and horizontal alignment materials was then obtained. The spin coating was first operated at 800 rmp for 10 sec and then at 3500 rmp for 100 sec. A soft film consisting of the horizontal and vertical alignment materials was formed with remnant solvents.

In order to drive out all the remnant solvents and to cure the polymers, the coated substrate was placed in an oven. It was first baked at 100° C. for 10 min (soft bake) and then baked at 230° C. for 90 min (hard bake), forming a hard film, i.e., the alignment layer. The surface of the alignment layer was subjected to rubbing treatment using a nylon cloth in such a way that the layer was rubbed in one direction one time.

Result:

The pretilt angle of the alignment layer produced accordingly to Example 2 was 53 degree.

In example 1, the liquid film becomes a soft solid film by spin coating. The solvent is evaporated slowly so that the domains of H and V tend to be larger. Also the ratio of surface areas of H and V domains will favor the material that has a higher solubility in the mixed solvent since the material with a lower solubility will precipitate first.

In example 2, the solidification is fast due to heating on a hot plate. Thus the domains tend to be smaller. The area ratio of the H and V domains will not be affect too much by the different solubility of the materials.

The pretilt angles obtained by the procedures in example 1 and example 2 are different, even for the same mixture of H and V alignment agents. This is because of the different domain structures obtained using the different procedures. Here is a Table listing the pretilt angles obtained for the same mixture using the two different methods.

Results

The pretilt angles of the liquid crystal molecules in contact with the alignment layer were measured by crystal rotation method.

The anchoring energies on the surface of the alignment layer were measured using the method described in the publication of Chigrinov et al (V Chigrinov, A Muravski, H S Kwok, H Takada, H Akiyama and H Takatsu, Anchoring properties of photo-aligned azo-dyes materials, Physical Review E, vol 68 pp 61702-61702-5, 2003).

Figure 8A:
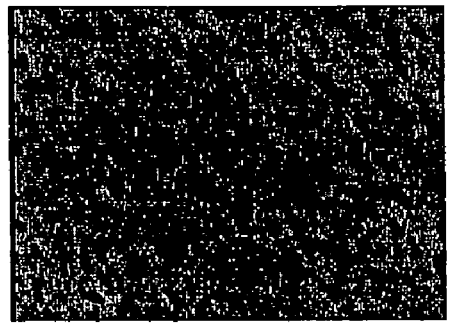
FIGS. 8A, 8B and 8C are optical photographs obtained from showing the nano-structures on the alignment layer containing 2.8%, 5.8% and 11.4% of the vertical alignment material JALS2021 respectively. The rest of the materials is Nissan SE610. Here the films are prepared by printing. Width of picture corresponds to 50 micron.
Figure 8B:
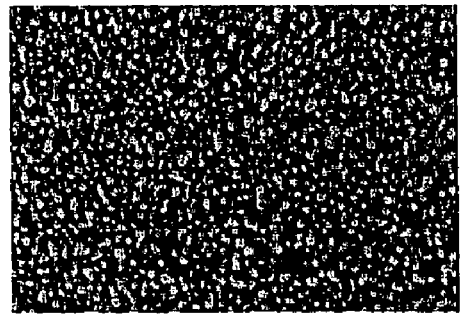
Figure 8C:
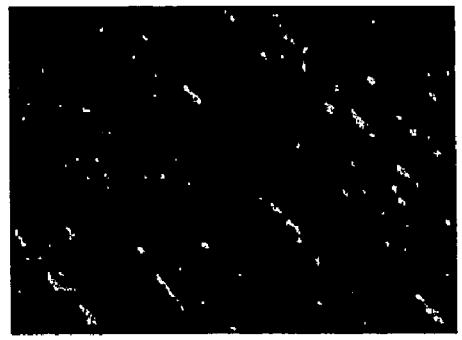

The domain structure on the surface of the alignment layer was observed by standard atomic force microscopy and optical microscopy. FIG. 8A shows the nano-structures on the alignment layer containing 5% JALS2021. FIG. 8B shows the nano-structures on the alignment layer containing 10% JALS2021. FIG. 8C shows the nano-structures on the alignment layer containing 15% JALS2021.

Example 3

In addition to Example 1 and 2, alignment layers capable of providing a range of pretilt angles were produced based on different proportions of vertical alignment layer (JALS2021) and horizontal alignment layer (JALS9203) and following procedures basically the same as described in Example 1 and Example 2. Details of alignment layers produced by spin-coating are shown in Table 1. Details of alignment layers produced by print-coating are shown in Table 2.

TABLE 1

Alignment layers produced by spin-coating

| Concentration of JALS2021 (Wt %) | Concentration of JALS9203 (Wt %) | Pre-tilt angle (degree) |
|---|---|---|
| 0 | 100 | 5 |
| 0.566 | 99.434 | 12.9 |
| 1.69 | 98.31 | 22.8 |
| 2.587 | 97.413 | 40.95 |
| 3.47 | 96.53 | 51.1 |
| 5.34 | 94.66 | 72.4 |
| 12.35 | 87.65 | 77 |
| 36 | 64 | 83.5 |
| 100 | 0 | 87 |

TABLE 2

Alignment layers produced by print-coating

| Concentration of JALS 2021 (wt %) | Concentration of JALS 9203 (wt %) | Pre-tilt Angle (degree) |
|---|---|---|
| 2.3 | 97.7 | 4.8 |
| 6 | 94 | 5.25 |
| 15.8 | 84.2 | 21.7 |
| 18.7 | 81.3 | 24.75 |
| 27.3 | 72.7 | 37.4 |
| 36 | 64 | 53.4 |
| 51 | 49 | 77 |
| 69 | 31 | 86 |
| 100 | 0 | 87 |

The crucial step in the preparation of the new alignment layer is the formation of nano-structures during the solid film formation process. Since the two alignment materials precipitate at different times in the solid film formation process, nano- and micro structures are formed. FIGS. 5A-5C show examples of the film structure observed under standard atomic force microscopy formed in according with the present invention. In these figures, the lighter area shows the V material. The percentages of V increase from FIG. 5A to C. These samples are produce by spin coating process where the transformation from liquid film to solid film is relatively slow and there is more time allowed for segregation of the two alignment materials. In these examples, the features of the nano-structures are of the size of a fraction of a micrometer. In many other cases, the nano-structures can be as small as a few nanometers. The nano-structure is usually of the form of islands of vertical alignment material in a matrix of the homogeneous alignment material. This structure is determined by the surface tension, surface energies, elasticity and other physical properties of the two materials as well as that of the common solvent. They are all useful for this embodiment.

Using the above-mentioned alignment layer, a liquid crystal cell was prepared, whereby flawless uniform alignment was obtained. The pretilt angle of the liquid crystal molecules are shown in FIG. 6. FIG. 6 shows the pretilt angles measured against different concentrations of JALS2021. It can be seen that the pretilt angles can be controlled by the percentage of JALS2021 from about 5° to near 80° as the concentration of JALS2021 goes from 0% to about 14%.

Figure 7:
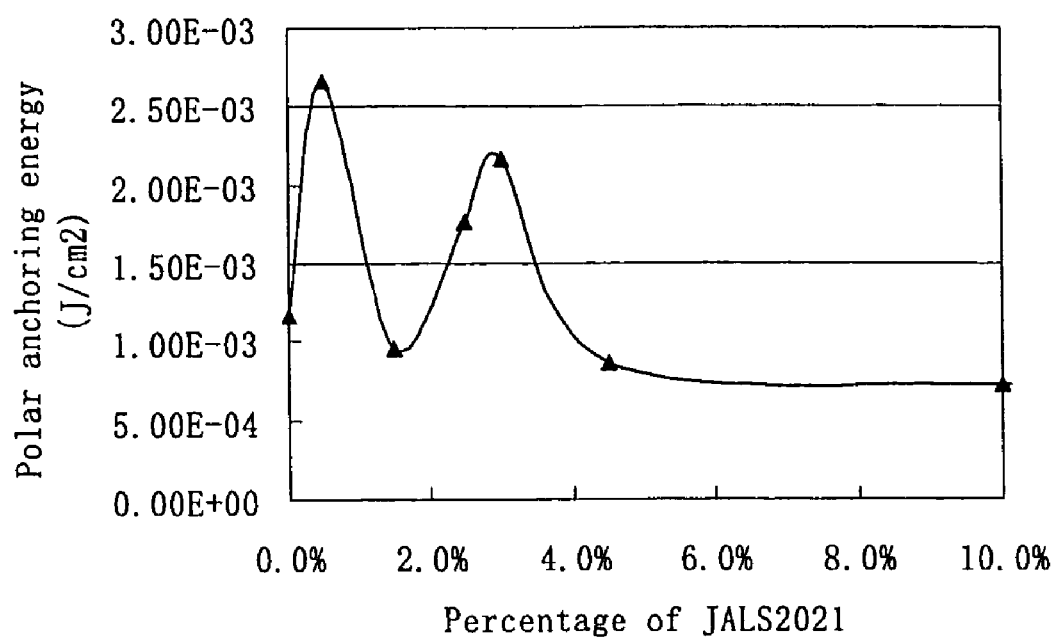
FIG. 7 is a chart showing the relationship between the polar anchoring energy and the concentration of vertical alignment material (JALS 2021) in accordance with the still another aspect of the present invention.

The polar anchoring energies of the surface of the alignment layer were also measured and shown in FIG. 7. It can be seen that the anchoring energy varies according to the percentage of JALS2021.

Figure 9:
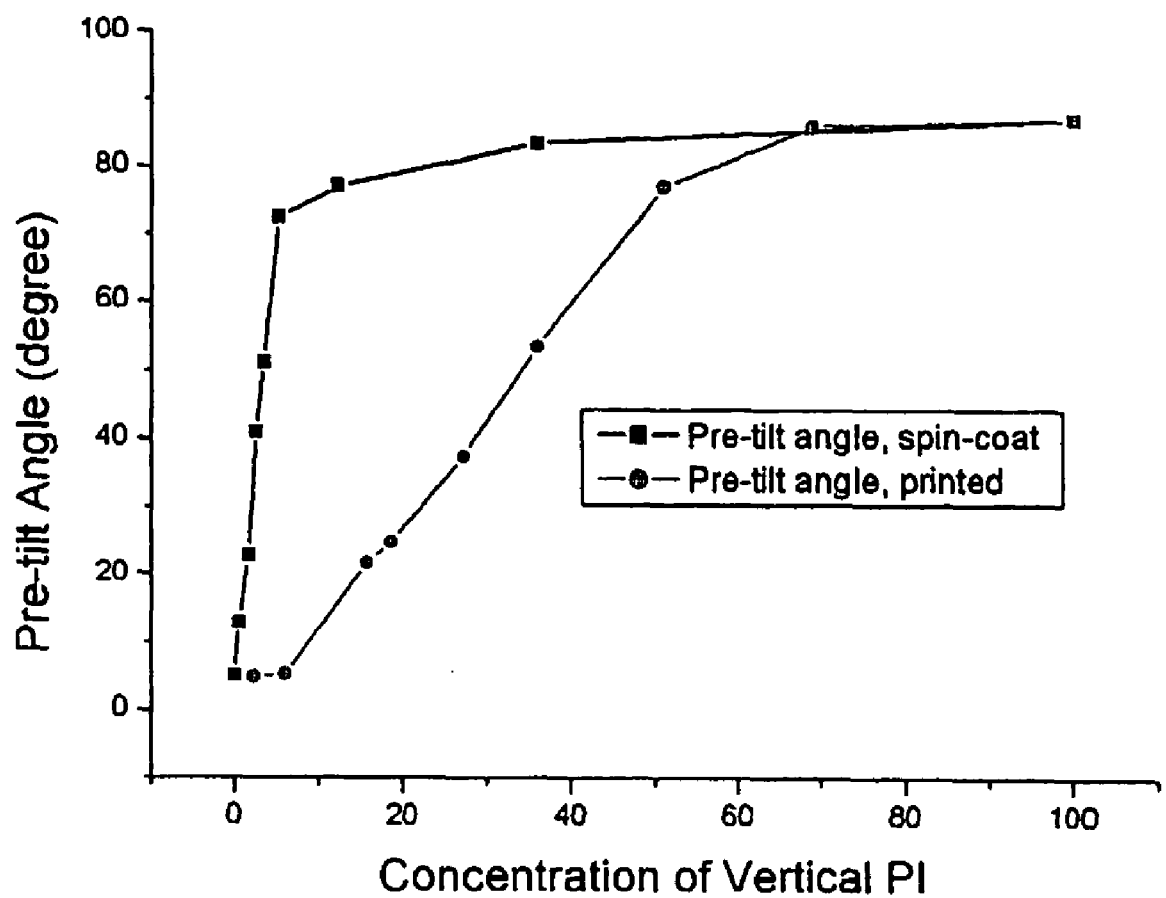
FIG. 9 is a diagram showing the pretilt angles obtained as a function of the concentration of the vertical alignment material (JALS2021).

The method of preparation of the solid film from the solution mixture is important in determining the nano-structures of the alignment layer and hence the pretilt angle that can be achieved. FIG. 8A-C show the optical micrograph of the surface structures of the alignment layers obtained by printing followed by rapid heating to convert the liquid film into a solid film. In this case, the nano-structures are domains consisting of V and H materials. In these pictures, the dark area are the V material while the bright areas are the H material. The percentage of V materials in FIG. 8A,B,C are 2.8%, 5.8% and 11.4% respectively. The width of the pictures correspond to 50 microns. Hence it can be seen that the nano-domains are less than 1 micron typically. FIG. 9 shows the pretilt angles obtained as a function of the relative concentration of the V material for several coating methods. The case of spin coating has already been seen in FIG. 6. It can been seen that the pretilt angle obtained by quite dependent on the method of preparation of the solid film.

FIG. 9 shows that for the same solution mixture, quite different pretilt angles are obtained. This is a result of the different nano-structures obtained. In this invention, we do not exhaust all methods of preparing the solid film from the solution mixture. Suffice it to say that for each method of preparation of the solid film from the solution mixture 46, there will be a new set of results of the pretilt angle versue the percentage of the vertical alignment material.

The dependence of the pretilt angle achieved on the method of preparation of the solid film can be understood conceptually. Physically, the two types of domains will interact with the liquid crystal molecules. Their alignment forces will compete with each other resulting in an alignment which is intermediate between vertical alignment and horizontal alignment. By varying the relative concentrations of the homeotropic and homogeneous alignment materials, pretilt angles of various values can be produced.

The change in orientation of the liquid crystal layer caused by the above-described nano-domain may be seen as the creation of a uniform alignment layer a short distance away from the alignment surface, as illustrated in FIG. 4A. In this illustration, the vertical (V) and horizontal (H) material a mixed but the main as islands adjacent each other in the alignment layer. The final pretilt angle obtained is strongly dependent on the relative area ratio of the V and H materials. In the formation of the solid film from the liquid film, the volume ratio of V vs H may not be the same as the surface ratio of V vs H. In a slow precipitation case, the material with a smaller solubility will solidify first. This solid will adhere to the substrate. Thus the solid precipitate from the material with a higher solubility will appear on top of the entire film. Thus the area ratio of V vs H can be much higher than the actual volume ratio. Depending on the surface tension of the second material which precipitates on the top, it can form domains as schematically indicated in FIGS. 4C and 4D, or form a network in indicated in FIG. 5C. On the other hand, if the formation of the solid is fast, then the nano-structure is more likely to be represented schematically by FIG. 4E. Here the area ratio and the volume ratio of V to H will be quite the same.

The alignment layer produced according to the description of the present invention could have many applications. For example, it can be used in a liquid crystal cell of an LCD device. The LCD device using the alignment layer of the present invention has the advantages of improved response speed, wide viewing angles, and excellent image retention properties. Other applications conceivable to those skilled in the art are not detailed herein.

Other embodiments of the invention will be apparent to those skilled in the art from consideration of the specification and practice of the invention disclosed herein. Although most embodiments of the present invention uses polymer blends mixing two types of polymers that provide vertical and horizontal aligning ability respectively in forming alignment layers, it is understood that other polymers could also be used for preparing alignment layers. For example, in addition to JALS9203, other commercial products can be used as horizontal alignment materials, such as AL1454, AL5056, AL3046, JALS-1216, JALS-1217, SE-7992, SE-7492 and SE-5291. In addition to JALS-2021, other commercial products can be used as vertical alignment materials, such as JALS-2066, SE-7511L and SE-1211.

For another example, a homopolymer having one kind of side-chain structures that provides horizontal alignment ability and another kind of side-chain structures that provide vertical aligning ability can be used. The side chains of the homopolymer can be manipulated in achieving the desired pretilt angles. For another example, copolymers comprising one type of monomers that provides vertical alignment ability and another type of monomers that provides horizontal alignment ability can also be used. The constituent monomers in the copolymers can also be controlled in achieving the desired pretilt angles.

Although in the examples, the alignment materials purchased commercially were already dissolved in solvents, it is possible to select alignment materials and solvents individually as described in FIG. 4. Solvents that can be used are those that are miscible with both horizontal and vertical alignment materials. The solvents should be so miscible with the two types of materials such that when the two materials are dissolved in the solvent, a homogeneous solution comprising nano-sized droplets will be formed. When the alignment layer is formed from such solution, nano-sized structures of the two materials could be observed using standard atomic force microscopy. Indratmoko Hari Poerwanto and Gudrun Schmidt-Naake (Telaah, Jilid XXII, No. 1-2, 2001) provided a practical scheme for predicting polymer miscibility. Based on the existing knowledge, it is believed that those skilled in the art should be able to select the appropriate solvent to dissolve the vertical and horizontal alignment materials with desired miscibility according the present invention.

It is intended that the specification and examples be considered as exemplary only, with a true scope and spirit of the invention being indicated by the following claims.

The invention claimed is:

1. A liquid crystal alignment structure comprising:
a liquid crystal layer having liquid crystal molecules, the liquid crystal layer having first and second surfaces;
at least one horizontal alignment material providing a first pretilt angle to the liquid crystal molecules in the liquid crystal layer;
at least one vertical alignment material providing a second pretilt angle to the liquid crystal molecules in the liquid crystal layer;
the first and second alignment materials being combined such that one of either the first or second alignment materials forms nano-domains that are smaller than one micron in a matrix of the other of the first or second alignment materials, the combined first and second alignment materials being formed from a solvent solution, the solvent solution being miscible with both the first and second alignment materials such that the nano-sized domains are formed on evaporation of the solvent; and
a layer of the combined first and second alignment materials being positioned adjacent at least the first surface of the liquid crystal layer such that non-uniform pretilt angles are induced in surface liquid crystal molecules of the adjacent liquid crystal surface layer, and a substantially uniform pretilt angle of approximately 10 degrees to approximately 80 degrees is formed away from the surface liquid crystal molecules at a distance in the liquid crystal layer smaller than a cell gap of the liquid crystal layer.

2. A liquid crystal alignment structure according to claim 1 further comprising a layer of the combined first and second alignment materials being positioned adjacent the second surface of the liquid crystal layer.

3. The liquid crystal alignment structure according to claim 1 wherein at least one of the alignment materials is a polymer.

4. The liquid crystal alignment structure according to claim 3 wherein the polymer is a radiation-alignable polymer.

5. The liquid crystal alignment structure according to claim 1, wherein at least one of said alignment materials is selected from a group consisting of polyimide, polystyrene, polymethyl methacrylate, polycarbonates, polyamic acid, and polyvinyl alcohol.

6. The liquid crystal alignment structure according to claim 1, wherein at least one of said alignment materials are polyimides.

7. The liquid crystal alignment structure according to claim 1, wherein the weight ratio of the horizontal alignment material to the vertical alignment material is 1:99 to 99:1.

8. The liquid crystal alignment structure according to claim 1, wherein the weight ratio of the horizontal alignment material to the vertical alignment material is 1:4 to 4:1.

9. A liquid crystal display device incorporating the liquid crystal alignment structure of claim 1.

10. A liquid crystal alignment structure comprising:
a liquid crystal layer having liquid crystal molecules, the liquid crystal layer having first and second surfaces;
at least one horizontal alignment material providing a first pretilt angle to the liquid crystal molecules in the liquid crystal layer;
at least one vertical alignment material providing a second pretilt angle to the liquid crystal molecules in the liquid crystal layer;
the first and second alignment materials being combined such that each of the first and second alignment materials form discontiguous nano-domains smaller than one micron within the alignment layer, the combined first and second alignment materials being formed from a solvent solution, the solvent solution being miscible with both the first and second alignment materials such that the nano-sized domains are formed on evaporation of the solvent; and
a layer of the combined first and second alignment materials being positioned adjacent at least the first surface of the liquid crystal layer such that non-uniform pretilt angles are induced in surface liquid crystal molecules of the adjacent liquid crystal surface layer, and a substantially uniform pretilt angle of approximately 10 degrees to approximately 80 degrees is formed away from the surface liquid crystal molecules at a distance in the liquid crystal layer smaller than a cell gap of the liquid crystal layer.

11. A liquid crystal alignment structure according to claim 10 further comprising a layer of the combined first and second alignment materials being positioned adjacent the second surface of the liquid crystal layer.

12. The liquid crystal alignment structure according to claim 10 wherein at least one of the alignment materials is a polymer.

13. The liquid crystal alignment structure according to claim 12 wherein the polymer is a radiation-alignable polymer.

14. The liquid crystal alignment structure according to claim 10, wherein at least one of said alignment materials is selected from a group consisting of polyimide, polystyrene, poly-methyl methacrylate, polycarbonates, polyamic acid, and polyvinyl alcohol.

15. The liquid crystal alignment structure according to claim 10, wherein at least one of said alignment materials are polyimides.

16. The liquid crystal alignment structure according to claim 10, wherein the weight ratio of the horizontal alignment material to the vertical alignment material is 1:99 to 99:1.

17. The liquid crystal alignment structure according to claim 10, wherein the weight ratio of the horizontal alignment material to the vertical alignment material is 1:4 to 4:1.

18. A liquid crystal display device incorporating the liquid crystal alignment structure of claim 10.

19. A method for making a liquid crystal alignment structure comprising:
   providing a liquid crystal layer having liquid crystal molecules, the liquid crystal layer having first and second surfaces;
   providing at least one horizontal alignment material imparting a first pretilt angle to the liquid crystal molecules in the liquid crystal layer;
   providing at least one vertical alignment material imparting a second pretilt angle to the liquid crystal molecules in the liquid crystal layer;
   wherein the first and second alignment materials are combined such that one of either the first or second alignment materials forms nano-domains smaller than one micron in a matrix of the other of the first or second alignment materials, the combined first and second alignment materials being formed from a solvent solution, the solvent solution being miscible with both the first and second alignment materials such that the nano-sized domains are formed on evaporation of the solvent and
   positioning a layer of the combined first and second alignment materials adjacent at least the first surface of the liquid crystal layer such that non-uniform pretilt angles are induced in surface liquid crystal molecules of the adjacent liquid crystal surface layer, and a substantially uniform pretilt angle of approximately 10 degrees to approximately 80 degrees is formed away from the surface liquid crystal molecules at a distance in the liquid crystal layer smaller than a cell gap of the liquid crystal layer.

20. A method for making a liquid crystal alignment structure according to claim 19 wherein the combining comprises forming a liquid film comprising at least the horizontal and/or vertical alignment materials.

21. A method for making a liquid crystal alignment structure according to claim 19 wherein the combining comprises forming a liquid film of both the horizontal and vertical alignment materials.

22. A method for making a liquid crystal alignment structure according to claim 19 wherein the combining comprises forming at least a first liquid film of the horizontal and vertical alignment materials on a substrate.

23. A method for making a liquid crystal alignment structure according to claim 19 wherein the method further comprises adding a solvent to the liquid film.

24. A method for making a liquid crystal alignment structure according to claim 19 wherein the method further comprises:
   a. curing said liquid film to form a hardened solid film wherein such a solid film consists of nano-structures of at least one of the vertical and horizontal alignment materials; and
   b. treating the hardened solid film to obtain an alignment film which can impart a high pretilt angle to a liquid crystal layer.

25. A method for making a liquid crystal alignment structure comprising:
   providing a liquid crystal layer having liquid crystal molecules, the liquid crystal layer having first and second surfaces;
   providing at least one horizontal alignment material imparting a first pretilt angle to the liquid crystal molecules in the liquid crystal layer;
   providing at least one vertical alignment material imparting a second pretilt angle to the liquid crystal molecules in the liquid crystal layer;
   combining the first and second alignment materials such that each of the first and second alignment materials form discontiguous nano-domains smaller than one micron within the alignment layer, the combined first and second alignment materials being formed from a solvent solution, the solvent solution being miscible with both the first and second alignment materials such that the nano-sized domains are formed on evaporation of the solvent; and
   a layer of the combined first and second alignment materials being positioned adjacent at least the first surface of the liquid crystal layer such that non-uniform pretilt angles are induced in surface liquid crystal molecules of the adjacent liquid crystal surface layer, and a substantially uniform pretilt angle of approximately 10 degrees to approximately 80 degrees is formed away from the surface liquid crystal molecules at a distance in the liquid crystal layer smaller than a cell gap of the liquid crystal layer.

26. A method for making a liquid crystal alignment structure according to claim 25 wherein the combining comprises forming a liquid film comprising at least the horizontal and/or vertical alignment materials.

27. A method for making a liquid crystal alignment structure according to claim 25 wherein the combining comprises forming a liquid film of both the horizontal and vertical alignment materials.

28. A method for making a liquid crystal alignment structure according to claim 25 wherein the combining comprises forming at least a first liquid film of the horizontal and vertical alignment materials on a substrate.

29. A method for making a liquid crystal alignment structure according to claim 25 wherein the method further comprises adding a solvent to the liquid film.

30. A method for making a liquid crystal alignment structure according to claim 14 wherein the method further comprises:
   a. curing said liquid film to form a hardened solid film wherein such a solid film consists of nano-structures of at least one of the vertical and horizontal alignment materials; and
   b. treating the hardened solid film to obtain an alignment film which can impart a high pretilt angle to a liquid crystal layer.

31. A method for making a liquid crystal alignment structure according to claim 30 wherein the treating comprises radiation alignment.

* * * * *